(12) United States Patent
Tregenza Dancer et al.

(10) Patent No.: US 12,468,603 B1
(45) Date of Patent: Nov. 11, 2025

(54) PROVIDING EXTREMELY HIGH READ AVAILABILITY IN A TELECOMMUNICATION ENVIRONMENT

(71) Applicant: Microsoft Technology Licensing, LLC, Redmond, WA (US)

(72) Inventors: Colin Michael Tregenza Dancer, Fordingbridge (GB); Olga Arkhangelskaia, London (GB); Keith Stuart Wansbrough, Falkirk (GB); Martin George Davidson, Edinburgh (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/759,312

(22) Filed: Jun. 28, 2024

(51) Int. Cl.
*G06F 11/14* (2006.01)
*G06F 16/27* (2019.01)

(52) U.S. Cl.
CPC ...... *G06F 11/1448* (2013.01); *G06F 11/1464* (2013.01); *G06F 16/273* (2019.01); *G06F 2201/80* (2013.01); *G06F 2201/84* (2013.01)

(58) Field of Classification Search
CPC ............... G06F 11/1448; G06F 16/273; G06F 2201/80; G06F 2201/84
See application file for complete search history.

(56) References Cited

U.S. PATENT DOCUMENTS

| | | | |
|---|---|---|---|
| 8,713,376 B1* | 4/2014 | Makin | G06F 11/1461 707/654 |
| 9,626,262 B1* | 4/2017 | Vogel | H04L 43/0817 |
| 2008/0052327 A1* | 2/2008 | Buah | G06F 11/2023 |
| 2020/0293407 A1* | 9/2020 | Depoutovitch | G06F 11/1469 |
| 2022/0164266 A1* | 5/2022 | Butucea Panait | G06F 16/273 |
| 2024/0143460 A1* | 5/2024 | Tan | G06F 11/2025 |
| 2024/0406057 A1* | 12/2024 | Sarath | H04L 67/141 |

* cited by examiner

*Primary Examiner* — Robert W Beausoliel, Jr.
(74) *Attorney, Agent, or Firm* — Ray Quinney & Nebeker P.C.; James S. Bullough

(57) ABSTRACT

The present disclosure generally relates to providing extremely high read availability for data repositories within a telecommunication network. Systems described herein implement a novel architecture and backup scheme in connection with non-customized data servers to provide at least 99.99999% read availability within a telecommunication network. In one or more examples, the novel architecture includes a primary database and hot backup database that mirrors the primary database. Additionally, the novel architecture further includes a tepid backup database that stores asynchronous snapshot replications of the primary database that are sent to the tepid backup database out-of-band. In the event of a cascading failure that affects the primary database and the hot backup database, the best snapshot replication stored by the tepid backup database is initialized to service a read request that would otherwise have failed.

20 Claims, 4 Drawing Sheets

PROVIDING EXTREMELY HIGH READ AVAILABILITY IN A TELECOMMUNICATION ENVIRONMENT

FIELD OF TECHNOLOGY

This disclosure relates to providing extremely high read availability within a telecommunication environment (e.g., a 5G cellular network).

BACKGROUND

Cellular networks can provide computing devices (e.g., mobile devices) with access to services available from one or more data networks. A cellular network is typically distributed over geographical areas that include one or more base stations and core network devices that provide a cell with network coverage. The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN) and a core network. The RAN may include base stations that communicate wirelessly with user devices (e.g., mobile devices) and facilitate interaction with components of a core network. The core network may provide access to services and data available from one or more external networks. As noted above, cellular networks are often used to provide Internet connectivity to mobile devices.

Often the core network includes various data repositories that store information associated with subscribers of the cellular network and the services provided to those subscribers. For example, subscribers' mobile devices may request data from these repositories as part of an initial registration process, and further during network usage once the mobile devices are registered within the cellular network.

Current standards require an extremely high read availability of these data repositories within the cellular network. For example, the 3$^{rd}$ Generation Partnership Project (3GPP) requires that such repositories maintain more than 99.99999% (e.g., "seven-nines") read availability. This results in less than one read outage per decade of time, even in the face of "smoking hold events," such as facility fires, network problems, and other malfunctions. This extremely high read availability rate is generally difficult to provide and requires that large data repositories have custom configurations and programming to meet this standard. These customized repository solutions, however, are inflexible and difficult to implement and scale. As such, a need exists for providing high read availability in connection with highly utilized data repositories-such as those that exist within cellular networks.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1:
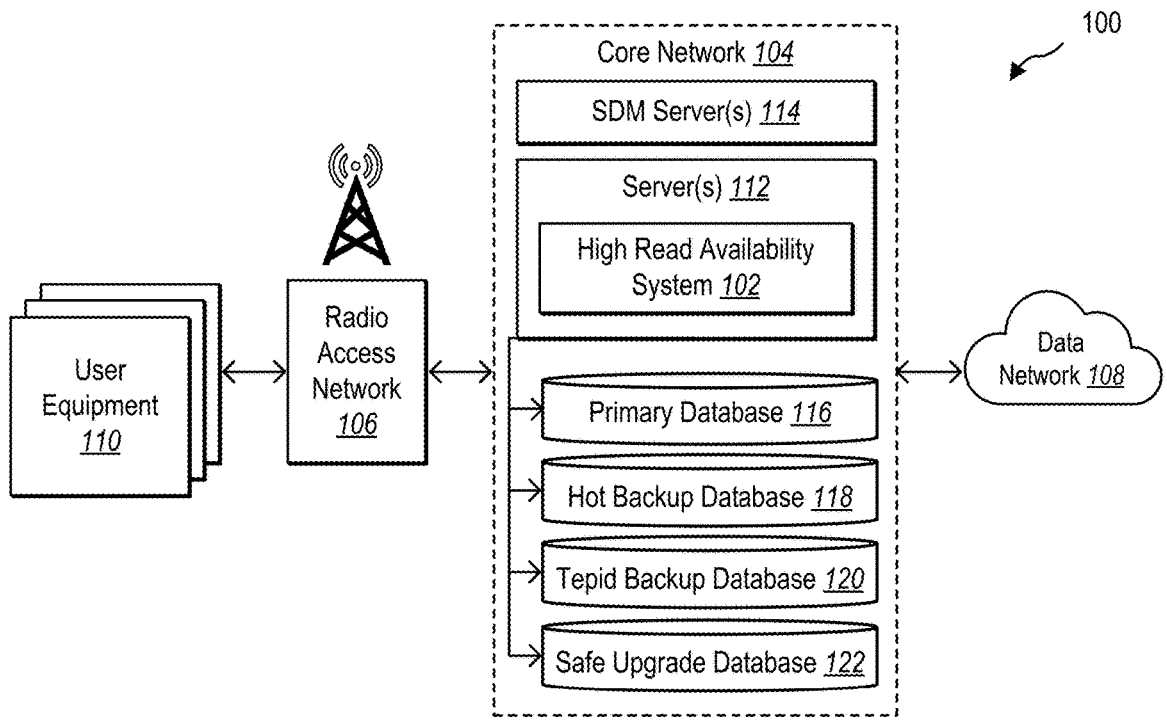
FIG. 1 illustrates an example telecommunications network environment including a high read availability system implemented within a core network.

The present disclosure relates to systems, methods, and computer-readable media for providing extremely high read availability in connection with one or more telecommunication network data repositories. For example, and as will be discussed in greater detail below, the systems, methods, and computer-readable media discussed herein include a high read availability system that implements an architecture of data servers including a primary database, a hot backup database, and a tepid backup database across several logically linked yet physically separate layers of databases. In one or more implementations, the high read availability system implements these databases on standard SQL servers that require no customized configurations or programming. Instead, the high read availability system institutes a backup scheme that ensures data items within the layered architecture of data servers are available to be read according to the rigorous 3GPP standards-even when there are outages and failures within that architecture.

As an illustrative example, and as will be discussed in greater detail below, the high read availability system institutes the backup scheme that includes asynchronously replicating data from the primary database in a first logically linked layer to both the hot backup database in the first logically linked layer and the tepid backup database in a second logically linked layer. In at least one implementation, the high read availability system asynchronously replicates the data to the tepid backup database out-of-band such that operations in connection with the primary database and the hot backup database are not impacted.

In the event of a cascading fault that affects the primary server and the hot backup server in the first logically linked layer, the high read availability system maintains a flag in the tepid backup database in the second logically linked layer indicating a most recent snapshot backup of the primary server within the tepid backup database. Utilizing this flag, the high read availability system rapidly initializes that snapshot backup to respond to read requests. For example, the high read availability system can allow for read-only access of the snapshot backup by restoring the snapshot backup to the current SQL server instance running on the tepid backup database. Because the cascading fault is maintained within the first logically linked layer of databases, the tepid backup database in the second logically linked layer can maintain and initialize asynchronously replicated snapshots of the primary database that do not carry the fault.

In one or more implementations, as will be discussed in greater detail below, the high read availability system further maintains a safe upgrade database within the second logically linked layer in the architecture of SQL servers. For example, the high read availability system can utilize the safe upgrade database to upgrade additional databases. In at least one implementation, the high read availability system asynchronously replicates snapshots of the primary database to the safe upgrade database, and then restores a replicated snapshot from the safe upgrade database to a cleanly installed database at a new upgrade site. The newly upgraded database can be sandbox tested at the new upgrade site before migrating live data read requests to the newly upgraded database and allowing the previous primary database to go offline.

As will be discussed herein, the present disclosure includes a number of practical applications having features described herein that provide benefits and/or solve problems associated with providing extremely high read access in connection with telecommunication network databases. It will be appreciated that benefits discussed herein are provided by way of example and are not intended to be an exhaustive list of all possible benefits of the management system(s) described herein.

In one or more implementations, the high read availability system improves the flexibility of other repository management systems. For example, as mentioned above, other repository management systems require customized architectures and programming to ensure extremely high read availability. As such, these customized systems are rigidly tied to a single use. This—in turn—makes it difficult for these other repository management systems to scale to greater capacity and/or upgrade with additional features.

In contrast, the high read availability system discussed herein improves the flexibility of these conventional repository management systems by leveraging standard Structured Query Language (SQL) servers to achieve the extremely high read availability within a telecommunication network. In more detail, the high read availability system utilizes non-customized SQL servers within a novel architecture and backup process to ensure that data is available to be read at least 99.99999% of the time according to the rigorous 3GPP standards.

For example, the high read availability system employs a specific method of asynchronously replicating data from a primary SQL database to a "hot" SQL backup database and a "tepid" SQL backup database. As such, the hot backup database is ready to respond to read requests in the event of a failure in connection with the primary database. In the event of a cascading failure that affects both the primary database and the hot backup database, the high read availability system quickly utilizes the tepid backup database to respond to read requests. In this way, the high read availability system ensures the extremely high read availability required by the 3GPP standard.

Moreover, by ensuring this extremely high read availability, the high read availability system improves the efficiency of a telecommunication network. High read availability is crucial to modern telecommunication networks for many reasons. For instance, data is requested and read by telecommunication modules as part of mobile device registrations and the provision of other telecommunication network services. As such, any slowdown in read availability inevitably leads to data bottlenecks, request timeouts, and other cascading failures. The high read availability system avoids these outcomes by implementing a novel architecture of SQL servers that work together to ensure that data within the telecommunication network is available to be read at least 99.99999% of the time.

Additionally, the high read availability system avoids the instability inherent to relying on customized data repository and specialized programming. For example, as discussed above, other data repository systems rely on customized server setups and configurations to meet the 3GPP standards. Instead of this, the high read availability system implements a new way of governing standard SQL servers to meet the same standards. As such, the high read availability system quickly mirrors a backup to a newly installed SQL database. This—in turn—ensures a high level of agility in installing and sandbox testing new databases such that older database servers can be serviced and/or taken offline.

As illustrated in the foregoing discussion and as will be discussed in further detail herein, the present disclosure utilizes a variety of terms to describe features and advantages of methods and systems described herein. Some of these terms will be discussed in further detail below.

As used herein, a "telecommunication network" refers to a group of interconnected nodes that facilitate the exchange of messages and signals. In one or more implementations, a telecommunications network includes nodes such as server devices that are connected by links (i.e., wired or wireless). Often, a telecommunications network includes sophisticated routing systems that move messages and signals among the nodes of the network. In one or more implementations, a telecommunication network as discussed herein includes a fifth generation (5G) mobile communication network.

As used herein, a "core network" refers to a backbone of nodes within a larger telecommunications network that is generally considered to be the most crucial part of the telecommunications network. Generally, a core network can include multiple layers. For example, a core network may include an access layer that connects user equipments with the telecommunications network, a distribution layer that connects the access layer with a core layer by providing routing and traffic management, and the core layer that handles connectivity and user services.

As used herein, the "logically linked layers of physically separate databases" refers to the architecture of databases implemented by the high read availability system. For example, the high read availability system maintains multiple physically separate database servers. Despite this physical separation, the high read availability system maintains logically linked layers of databases within this architecture. To illustrate, each linked layer includes two or more databases that share a replication scheme. For example, in one implementation, the high read availability system maintains a primary database and a hot backup database in a first logically linked layer of the architecture because the primary database is automatically replicated to the hot backup database through a standard technique such as hot replication. The high read availability system can maintain a tepid backup database in a second logically linked layer that is separate from the first logically linked layer because the primary database is replicated as snapshots to the tepid backup database asynchronously. As such, in one or more embodiments, the layers of the database architecture are logically linked by backup schemes even though each of the databases within the architecture is physically separate.

As used herein, "subscriber data management functions" or "subscriber data management network functions" (or simply "SDM functions") refer to network functions within a core network of a telecommunication network that handle subscriber-related information and functions. For example, some network functions (or simply, "functions") may manage data for access authorization, user registration, and data network profiles. Often, SDM function handle the tasks involved in authorizing and routing network users. Other functions may allocate IP addresses and manage user sessions on the telecommunication network. Overall, subscriber data management functions optimize subscriber experiences and provide efficient network operations. Examples of subscriber data functions include authentication server functions (AUSFs), unified data management (UDM) functions, and user data repository (UDR) functions.

As used herein, a "database" refers to an organized collection of structured information or data. Often, databases are organized into tables of rows and columns. In most implementations, databases can handle larger volumes of data, support multiple requests, and provide complex logic and language for data manipulation. One or more embodiments described herein refer to databases including subscriber data stored in connection with one or more SDM functions. For example, as used herein, a database may refer to a database of subscriber data (e.g., authentication data, registration data) stored in connection with one or more of an AUSF, a UDM function, and/or a UDR function (or multiple functions). Moreover, as will be discussed in further detail below, a database may refer to one of a variety of different types of databases (e.g., primary database, backup database). Examples of these types of databases will be discussed in connection with various examples below.

In some cases, data items stored within a database can be accessed and/or managed with a domain-specific language such as Structured Query Language (SQL). SQL commands can execute queries against a database to retrieve data from the database. For example, in response to receiving a "read request" from a user equipment or subscriber data management function, the high read availability system can configure an SQL command that accesses the data item referenced by the read request and reads the information stored in the data items out. SQL commands can also execute queries against a database that insert, update, or delete data items within the database.

As used herein, a "snapshot backup" or "snapshot replication" of a database refers to a copy of a particular database as it was at a specific point in time. In some implementations, a snapshot backup or replication may be read-only and reflects the data and state of the particular database by way of a pointer file. In one or more embodiments, a snapshot backup or replication is initialized or "brought up" by restoring the snapshot to a specific server instance. In one or more implementations, a database backup or snapshot can include any other database replication mechanism. For example, a database backup can include log shipping, database mirror, or the like.

As used herein, a "fault" refers to an issue or failure in a database. For example, database faults can include, but are not limited to, system errors, data corruption, storage failures, network problems, concurrency issues, software defects, and security breaches. As used herein, a "cascading fault" refers to a series of dependent failures that occur in a chain reaction affecting multiple databases. For example, a cascading fault can occur when data in a primary database becomes corrupted. In one or more implementation, this corruption will be introduced into the hot backup database (i.e., through hot replication) thereby also corrupting the hot backup database. Cascading faults can cause the databases in the chain to become unusable or grid-locked.

As used herein, a "requesting entity" refers to any component of the telecommunication network that issues a read request. For example, in some implementations, a requesting entity includes a user equipment (e.g., a mobile device) or other endpoint that issues a read request for data stored within a database of the core network of the telecommunication network as part of a registration process. In another implementation, a requesting entity can include a component within the core network (e.g., the AUSF) that issues a read request for data stored by another component within the core network (e.g., the UDM).

Additional details will now be provided regarding systems described herein in relation to illustrative figures portraying example implementations. For example, FIG. 1 illustrates an example environment 100 for implementing features and functionality of a high read availability system 102 implemented on a network device (e.g., a server device 112) within a core network 104 of a telecommunications network. As shown in FIG. 1, the environment 100 includes a radio access network (RAN) 106 (or simply, "RAN 106"), the core network 104, and a data network 108. It will be appreciated that one or more features of the RAN 106, core network 104, and data network 108 may be implemented in whole or at least partially on a cloud computing system. For example, in one or more embodiments, portions of the RAN 106 may be virtualized on server nodes of the cloud computing system while some or all of the core network components may be implemented on server nodes of the cloud computing system.

As shown in FIG. 1, the server device 112 can include the high read availability system 102. Moreover, the core network 104 can include a number of subscriber data management (SDM) server(s) 114. A number of additional network functions may be implemented across the SDM server(s) 114 within the core network 104. For example, additional network functions may include policy control functions, charging functions, user plane functions, and so forth. Each of the respective functions may be implemented on or across multiple server nodes. As such, each of the SDM server(s) 114 may include an authentication server function (AUSF), a unified data management (UDM) function, and/or a user data repository (UDR) function. In at least one implementation, the SDM server(s) 114 may be accessed via a session management function (SMF) on any or all of the server device 112, and/or the SDM server(s) 114.

In at least one implementation, the core network 104 further includes a session management function (SMF). For example, the features and functionality of the SMF may be distributed across multiple nodes within the core network 104. Moreover, the SMF may work in concert with other functions such as the high read availability system 102. Thus, in some implementations, some or all of the functionality of the SMF may be co-located on the server device 112 with the high read availability system 102. In additional implementations, the SMF may be separately located from the high read availability system 102 within the core network 104

As further shown in FIG. 1, the high read availability system 102 within the server device 112 may be connected to or associated with one or more of a primary database 116, a hot backup database 118, a tepid backup database 120, and a safe upgrade database 122. In one or more implementations, the high read availability system 102 manages and controls the databases 116-122. Moreover, in some implementations, the databases 116-122 are positioned in physically separated locations to provide protection against smoking hole events (e.g., a catastrophic event that would affect all databases were they co-located-such as the loss of a data center due to fire or earthquake). In one or more implementations, the databases 116-122 can be read from and written to by any of the SDM server(s) 114, the SMF (discussed above), the user equipments 110, and/or the high read availability system 102.

As shown in FIG. 1, the environment 100 may include a number of user equipments (UEs) 110. The UEs 110 may refer to a variety of computing devices or endpoints including, by way of example, a mobile device such as a mobile telephone, a smartphone, a personal digital assistant (PDA), a tablet, or a laptop. One or more of the UEs 110 may refer to non-mobile devices such as a desktop computer, a server device, or other non-portable devices that communicate with other endpoint devices via the telecommunications network. In one or more embodiments, the UEs 110 may refer to applications or software constructs on a computing device. Each of the devices of the environment 100 may include features and functionality described generally below in connection with FIG. 5.

As shown in FIG. 1, the UEs 110 may communicate with the core network 104 via the RAN 106. As mentioned above, one or more components of the environment 100 may be implemented within an architecture of a cellular network. For example, as noted above, a cellular network may include a radio access portion inclusive of a network of mobile towers (or base stations) in combination with components of a core network 104. Thus, as used herein, a cellular network may refer broadly to an architecture inclusive of the radio access network 106 including the mobile towers and computing nodes of the core network 104.

Each of the UEs 110, the RAN 106, and components of the core network 104 may communicate via one or more networks. These networks may include one or more communication platforms or any technology for transmitting data. For example, a network may include the Internet or other data link that enables transport of electronic data between the UEs 110, the RAN 106, and components of the core network 104. In one or more embodiments, some or all of the components of the core network 104 are implemented on a cloud computing system. In addition, one or more embodiments of the RAN components may be virtualized and/or otherwise implemented as part of a cloud computing system. In one or more embodiments, components of the RAN 106 and/or core network 104 may be implemented on an edge network that has virtual connections to the internal data center(s) (e.g., the data network 108) of the cloud computing system.

Figure 2:
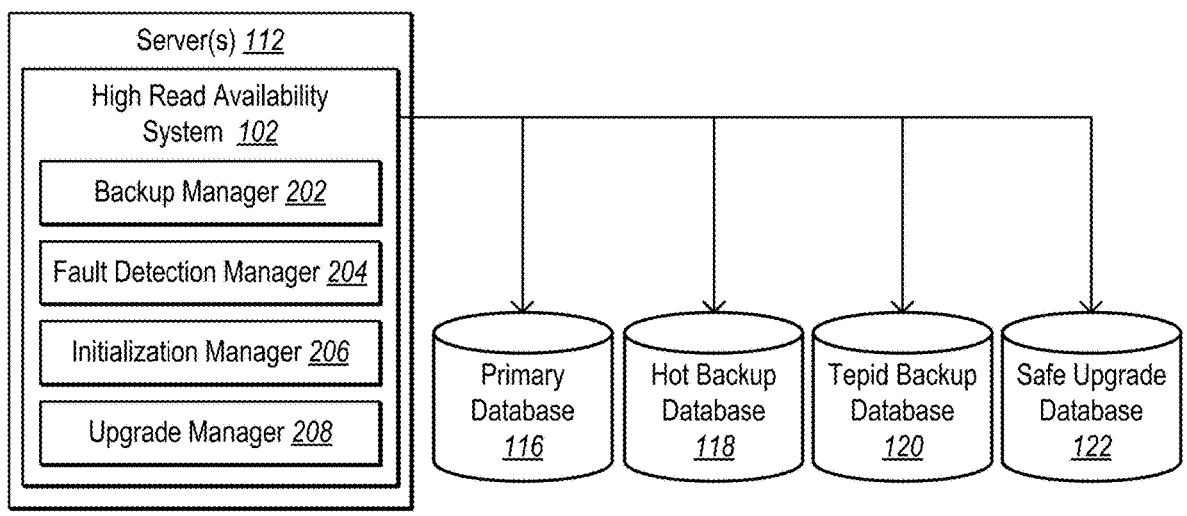
FIG. 2 illustrates the high read availability system implemented on a server device in accordance with one or more embodiments.

FIG. 2 illustrates additional detail with regard to the server device 112 and the components thereon. For example, as mentioned above, the server device 112 can include the high read availability system 102. As shown in FIG. 2, the high read availability system 102 can include a backup manager 202, a fault detection manager 204, an initialization manager 206, and an upgrade manager 208.

In one or more implementations, the high read availability system 102 asynchronously backs data up across the databases 116-122. In most implementations, the high read availability system 102 receives data item read requests and write requests from one or more of the UEs 110. The high read availability system 102 further receives data item read and write requests from one or more additional components of the core network 104 (e.g., the one or more SDM server(s) 114) and services those requests according to the architecture of the databases 116-122. Additionally, in some implementations, the high read availability system 102 provides a mechanism for safely upgrading the database software in order to deploy new features or address security or functional defects. To provide all these functionalities, the backup manager 202, the fault detection manager 204, the initialization manager 206 and the upgrade manager 208 will now be discussed in greater detail.

As just mentioned, the high read availability system 102 includes the backup manager 202. In one or more implementations, the backup manager 202 manages the tasks associated with backing up the primary database 116 to the hot backup database 118 and the tepid backup database 120. For example, the backup manager 202 engages in asynchronous backup procedures associated with the primary database 116. In at least one implementation, the backup manager 202 automatically replicates the primary database 116 to the hot backup database 118 asynchronously following every read request received by the high read availability system 102 without waiting for any confirmation communications. It one or more implementations, the hot backup database 118 is a read replica of the primary database 116 and can service read requests when the primary database 116 cannot.

Moreover, in one or more implementations, the backup manager 202 further asynchronously replicates the primary database 116 to the tepid backup database 120. For example, the backup manager 202 can perform asynchronous out-of-band snapshot replication of the primary database 116 to the tepid backup database 120 following a write request received by the high read availability system 102. In at least one implementation, the backup manager 202 maintains a flag within the tepid backup database 120 that indicates a last known good snapshot of the primary database 116 stored by the tepid backup database 120 (e.g., a last known snapshot in which it the data within the database is known to be accurate).

In more detail, the backup manager 202 can maintain this flag in various ways. In one implementation, the backup manager 202 can check the functionality of the SDM server(s) 114 after a threshold amount of time following the replication of the primary database 116 to the tepid backup database 120. For example, the backup manager 202 can wait the threshold amount of time (e.g., 30 minutes) following the primary database 116 replication before querying another component of the high read availability system 102—such as the fault detection manager 204—regarding the functionality and/or health of the SDM server(s) 114. In response, the fault detection manager 204 can indicate whether or not a fault has been detected in connection with the SDM server(s) 114. If the fault detection manager 204 indicates no fault has been detected for the threshold amount of time, the backup manager 202 can set and maintain the flag in connection with the backup taken at the beginning of the threshold amount of time indicating that that backup is "known good." If the fault detection manager 204 indicates that a fault was detected during the threshold amount of time (e.g., the previous 30 minutes), the backup manager 202 may not set any flag in connection with the back taken at the beginning of the threshold amount of time. As such, the backup manager 202 may make additional backups of the primary database 116 before setting a flag associated with a previous backup if the threshold amount of time is longer than the backup frequency.

In one or more implementations, the backup manager 202 also asynchronously replicates the primary database 116 to the safe upgrade database 122. As with the tepid backup database 120, the backup manager 202 can perform asynchronous out-of-band snapshot replication of the primary database 116 to the safe upgrade database 122 such that the safe upgrade database 122 holds one or more snapshots of the primary database 116 over time. For example, the backup manager 202 can create a snapshot replication (e.g., a read-only copy) of primary database 116 asynchronously without waiting for real-time updates, acknowledgements, or confirmations from the primary database 116 or the hot backup database 118. In at least one implementation, the backup manager 202 creates this asynchronous snapshot replication out-of-band in a way that is independent of the main data flow (e.g., the data that flows to the primary database 116 and then to the hot backup database 118.) As such, the backup manager 202 creates no additional waiting time in connection with read requests associated with the primary database 116.

As mentioned above, the high read availability system 102 includes the fault detection manager 204. In one or more implementations, the fault detection manager 204 monitors one or more of the primary database 116, the hot backup database 118, and the tepid backup database 120 to detect and report faults. For example, the fault detection manager 204 can continuously monitor the primary database 116 for transaction errors, system deadlock conditions, media failures, system crashes, and other faults. In response to detecting a fault, the fault detection manager 204 can report the detected fault to one or more additional components of the high read availability system 102 such as the initialization manager 206.

Additionally, as mentioned above, the fault detection manager 204 can monitor and detect faults in connection with other components of the core network 104. For example, the fault detection manager 204 can monitor and detect faults in connection with the SDM server(s) 114. In one or more implementations, the fault detection manager 204 can set a threshold amount of time during which a fault in connection with the SDM server(s) 114 might be expected (e.g., 30 minutes). The fault detection manager 204 can then monitor the SDM server(s) 114 for faults during the threshold amount of time and report any detected faults to other components of the high read availability system 102.

As mentioned above, the high read availability system 102 includes the initialization manager 206. In one or more implementations, the initialization manager 206 initializes one or more backup databases in response to a reported fault. For example, in response to the fault detection manager 204 reporting a fault with the primary database 116, the initialization manager 206 can designate the hot backup database 118 as the new primary database. In response to the fault detection manager 204 reporting a cascading fault that affects both the primary database 116 and the hot backup database 118, the initialization manager 206 can initialize a snapshot replication of the primary database 116 maintained by the tepid backup database 120. As mentioned above, the initialization manager 206 can identify the most recent good snapshot replication based on the flag within the tepid backup database 120 that is updated by the backup manager 202. The high read availability system 102 can then use the newly initialized snapshot to service the received read request.

As mentioned above, the high read availability system 102 includes the upgrade manager 208. In one or more implementations, the upgrade manager 208 upgrades cleanly installed new database sites utilizing the safe upgrade database 122. As discussed above, the backup manager 202 asynchronously backs up snapshot replications of the primary database 116 to the safe upgrade database 122. As such, the initialization manager 206 upgrades a cleanly installed new database site by restoring a replicated snapshot (e.g., a most recent replicated snapshot) stored by the safe upgrade database 122 to a cleanly installed backup database (e.g., a blank database install).

In at least one implementation, the upgrade manager 208 further deploys a cleanly installed second database (e.g., a second blank database install) as a hot backup database to the newly initialized database that was restored with the replicated snapshot. In this implementation, the upgrade manager 208 instructs the high read availability system 102 to reassign the newly initialized database that was restored with the replicated snapshot as the primary database 116. The upgrade manager 208 further causes the high read availability system 102 to redirect data item requests (e.g., read and write requests) from user equipments to the newly reassigned database. In this way, the upgrade manager 208 can facilitate taking the original primary database 116 and corresponding hot backup database 118 offline for repairs and upgrades in a controlled manner.

Figure 3:
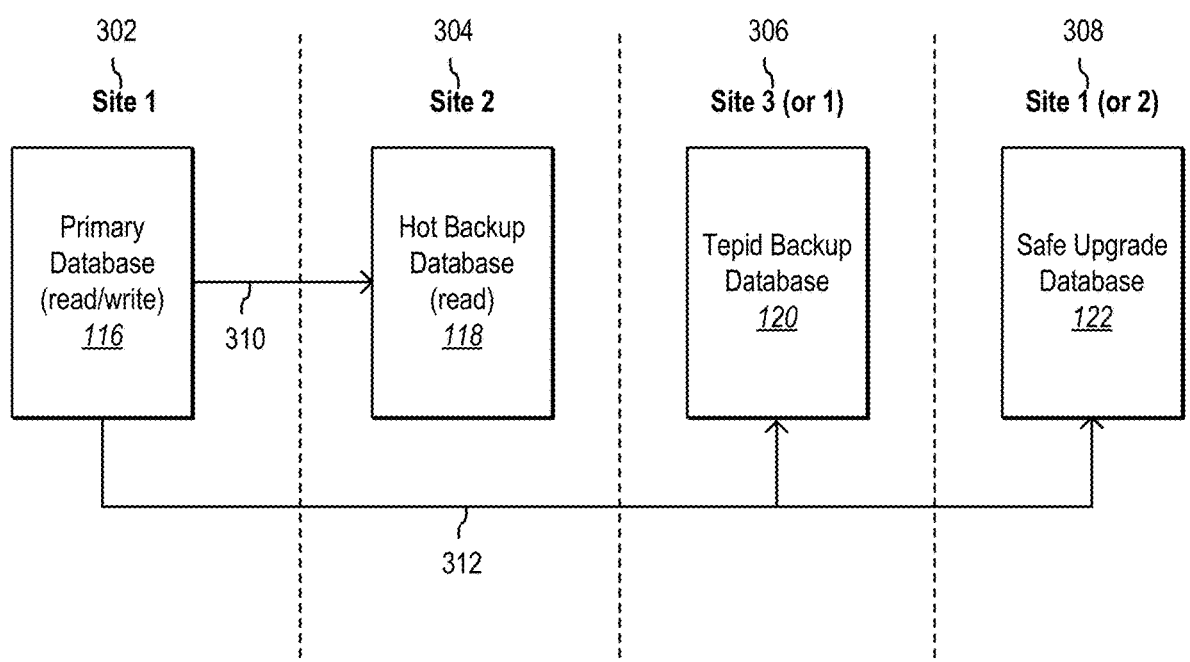
FIG. 3 illustrates an example of the high read availability system structuring utilizing a backup architecture of databases in accordance with one or more embodiments.

FIG. 3 illustrates an example overview of the steps taken by the high read availability system 102 in creating and maintaining a novel database architecture that ensures extremely high read availability within a 5G telecommunication network according to the 3GPP standard (e.g., five-nines availability). For example, as shown in FIG. 3, the high read availability system 102 can maintain the primary database 116, the hot backup database 118, the tepid backup database 120, and the safe upgrade database 122 across two or more physically separate sites. In at least one implementation, the high read availability system 102 maintains the databases 116-122 across physically separate sites to guard against "smoking hole events," such as network hardlines being cut, fire suppression system malfunctions, etc.

In one or more implementations, as shown in FIG. 3, the primary database 116 is replicated to the hot backup database 118 in an act 310. For example, the primary database 116 can respond to both read and write requests. In the event of a detected read fault, such as described above, the high read availability system 102 can automatically respond to read requests utilizing the hot backup database 118. In at least one implementation, the high read availability system 102 can support a manual write failover (e.g., intentionally or manually switching from the primary database 116 to the hot backup database 118 for write requests) to the hot backup database 118 as there is no requirement under 3GPP for more than 99.99% write availability. As discussed above, the high read availability system 102 can maintain the primary database 116 and the hot backup database 118 within a first logically linked layer of the architecture of databases illustrated in FIG. 3 because of the replication technique used in the act 310.

While the high read availability system 102 is backing up the primary database 116 to the hot backup database 118, the high read availability system 102 can also asynchronously backup snapshot replications of the primary database 116 to one or both of the tepid backup database 120 and the safe upgrade database 122 in an act 312. As discussed above, the high read availability system 102 can maintain the tepid backup database 120 and the safe upgrade database 122 in within a second logically linked layer of the architecture of databases illustrated in FIG. 3 because of the asynchronous snapshot replication technique used in the act 312. As discussed above, the high read availability system 102 can maintain a flag in the tepid backup database 120 indicating the most recent, good snapshot replication stored by the tepid backup database 120. Moreover, the safe upgrade database 122 may store only the most recent, good snapshot replication of the primary database 116 on the safe upgrade database 122.

In one or more implementations, the high read availability system 102 may implement the primary database 116 at the first site 302, the hot backup database 118 at the second site 304, and the tepid backup database 120 at the third site 306. In additional implementations, the high read availability system 102 may implement the tepid backup database 120 at the same physical site (e.g., the first site 302) as the primary database 116. Similarly, the high read availability system 102 may implement the safe upgrade database 122 at the same physical site (e.g., the first site 302) as the primary database 116 or at the same physical site (e.g., the second site 304 as the hot backup database 118.

Figure 4:
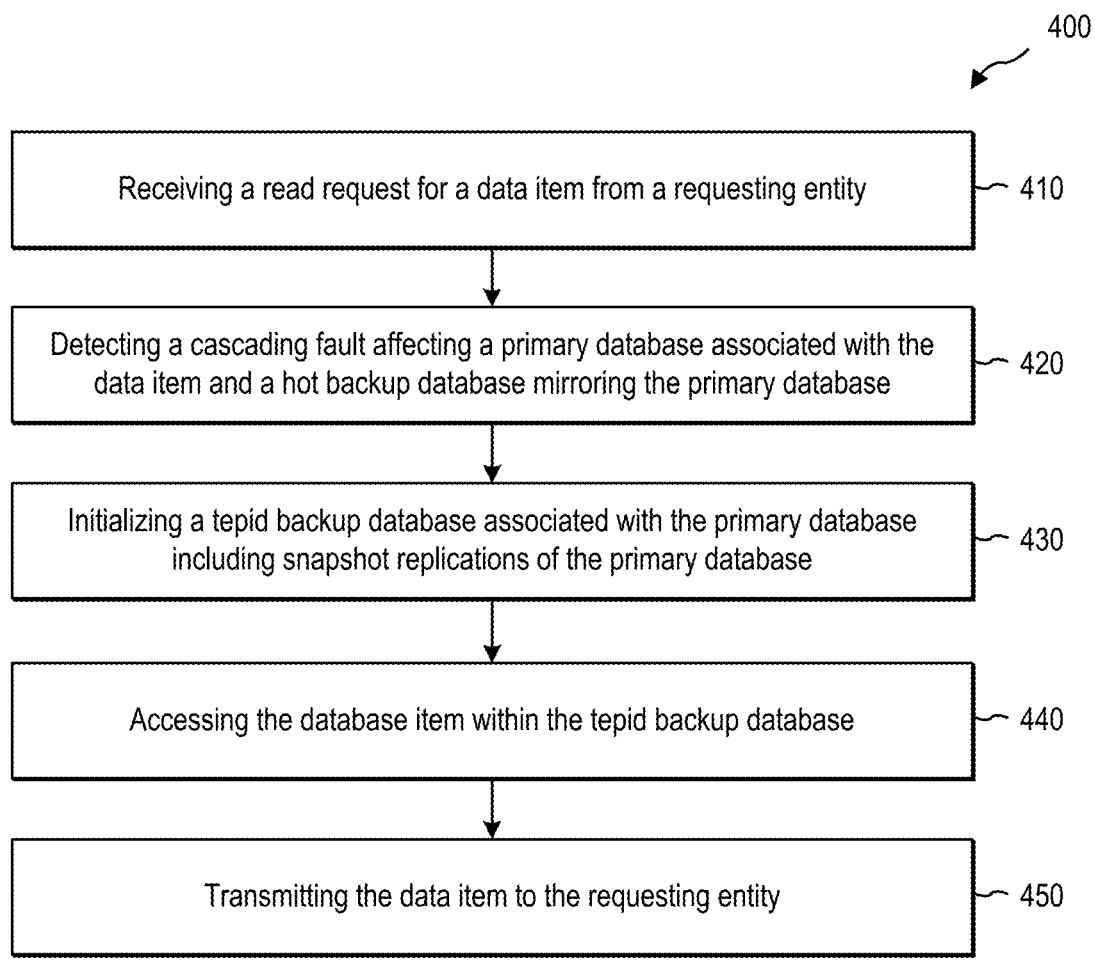
FIG. 4 illustrates an example series of acts for providing extremely high read availability within a 5G telecommunication network in accordance with one or more embodiments.

FIG. 4 illustrates an example series of acts 400 related to providing extremely high read availability for databases in the core network 104 of a telecommunication network (e.g., a 5G telecommunication network). As shown in FIG. 4, the series of acts 400 includes an act 410 of receiving, from a requesting entity, a read request for a data item stored on one or more databases within a core network of the telecommunication network. In one or more embodiments, the act 410 includes receiving, from a requesting entity, a read request for a data item stored on a first layer of the logically linked layers of the physically separate databases within the core network of the telecommunication network. In additional embodiments, the act 410 can further include receiving read requests from other components of the core network 104 such as the SDM server(s) 114 (e.g., shown in FIG. 1) and/or the subscriber management function (SMF). In one or more embodiments, each of the primary database (e.g., the primary database 116), the hot backup database (e.g., the hot backup database 118), and the tepid backup database (e.g., the tepid backup database 120) is a non-customized SQL data server.

In one or more embodiments, and in response to receiving the read request, the series of acts 400 further includes replicating the primary database to the hot backup database to provide read access to data items within the hot backup database. Additionally, the series of acts 400 can further include asynchronously replicating snapshots of the primary database to the tepid backup database out-of-band.

As further shown in FIG. 4, the series of acts 400 includes an act 420 of detecting a cascading fault affecting a primary database associated with the data item and a hot backup database mirroring the primary database. In one or more embodiments, the act 420 includes detecting a cascading fault affecting a primary database within the core network associated with the data item and a hot backup database within the core network mirroring the primary database, wherein the primary database and the hot backup database are within the first logically linked layer of the physically separate databases. In one or more embodiments, detecting the cascading fault can include detecting a server outage, a data read failure, or other type of fault that affects both the primary database and the hot backup database. As such, the detected cascading fault may prevent the requested data item from being read from either the primary database or the hot backup database.

As further shown in FIG. 4, the series of acts 400 includes an act 430 of initializing a tepid backup database associated with the primary database including snapshot replications of the primary database. In one or more embodiments, the act 430 includes, in response to detecting the cascading fault within the first logically linked layer, initializing a tepid backup database within a second logically linked layer of the physically separate databases within the core network, wherein the tepid backup database within the second logically linked layer is associated with the primary database and the hot backup database in the first logically linked layer and comprises asynchronously replicated snapshots of the primary database. In at least one implementation, the series of acts 400 includes maintaining at least one flag in the tepid backup database that indicates a last known or most recent good snapshot of the primary database. As such, in at least one implementation, initializing the tepid backup database includes determining a snapshot of the primary database indicated by the at least one flag, and restoring the snapshot of the primary database indicated by the at least one flag.

As further shown in FIG. 4, the series of acts 400 includes an act 440 of accessing the data item within the tepid backup database. In one or more implementations, the act 440 includes accessing the data item within the tepid backup database initialized with the asynchronously replicated snapshot of the primary database taken before the cascading fault. For example, once the snapshot of the primary database indicated by the at least one flag is initialized, the series of acts 400 includes accessing the requested data item within the now-initialized snapshot replication.

As further shown in FIG. 4, the series of acts 400 includes an act 450 of transmitting the data item to the requesting entity. For example, transmitting the data item to the requesting entity can include transmitting the information stored in the data item to the user equipment as a network message (e.g., an SMS message) or as metadata attached to a different type of communication.

Figure 5:
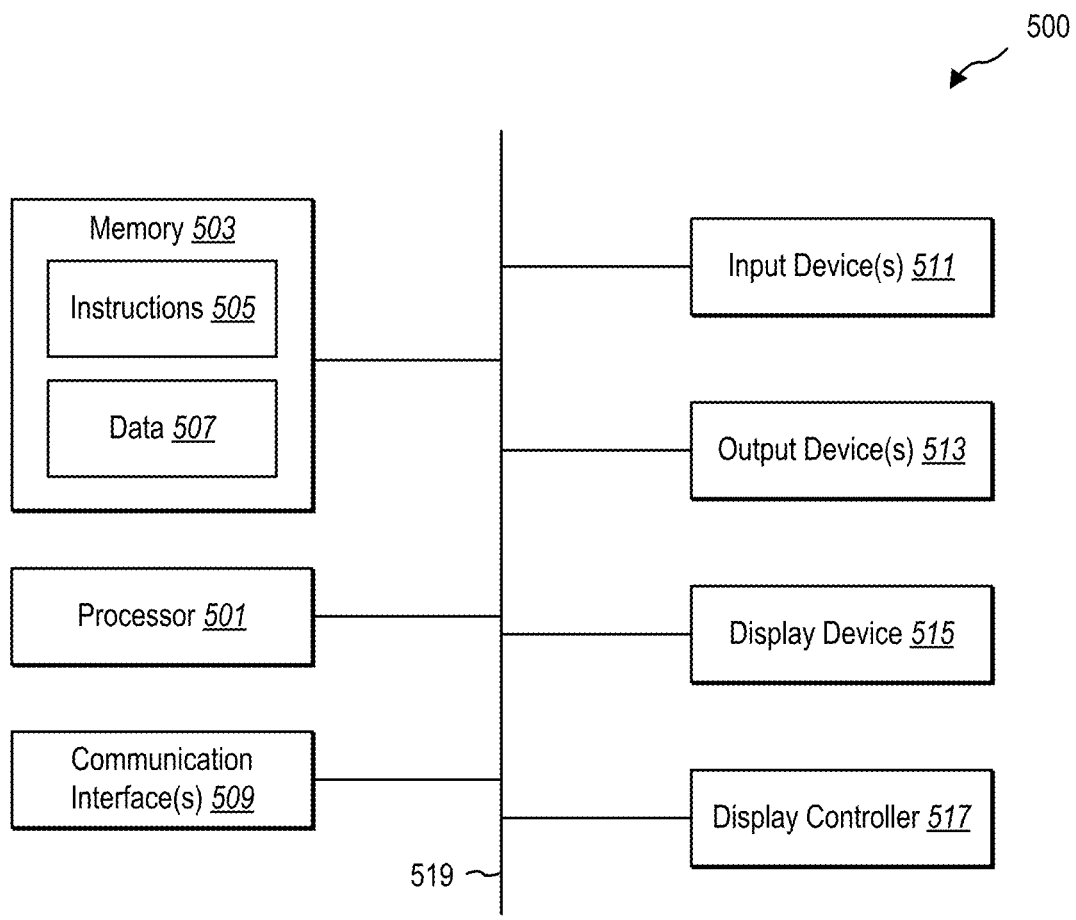
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a core network of a telecommunication network including a plurality of subscriber data management servers and logically linked layers of physically separate databases for maintaining high read availability of data maintained thereon, a method comprising:
    receiving, from a requesting entity, a read request for a data item stored on a first layer of the logically linked layers of the physically separate databases within the core network of the telecommunication network;
    detecting a cascading fault affecting a primary database within the core network associated with the data item and a hot backup database within the core network mirroring the primary database, wherein the primary database and the hot backup database are within the first logically linked layer of the physically separate databases;
    in response to detecting the cascading fault within the first logically linked layer, initializing a tepid backup database within a second logically linked layer of the physically separate databases within the core network, wherein the tepid backup database within the second logically linked layer is associated with the primary database and the hot backup database in the first logically linked layer and comprises asynchronously replicated snapshots of the primary database;
    accessing the data item within the tepid backup database initialized with the asynchronously replicated snapshot of the primary database taken before the cascading fault; and
    transmitting the data item to the requesting entity.

2. The method as recited in claim 1, further comprising asynchronously replicating snapshots of the primary database to a safe upgrade database within the second logically linked layer of the physically separate databases.

3. The method as recited in claim 2, further comprising utilizing the safe upgrade database by:
    deploying a cleanly installed first backup database to an upgrade site;
    restoring a replicated snapshot from the safe upgrade database to the first backup database;
    deploying a cleanly installed second database as a hot backup database to the first backup database;
    reassigning the first backup database as the primary database; and
    redirecting data item read requests from user equipments to the reassigned first backup database.

4. The method as recited in claim 1, wherein the primary database, the hot backup database, and the tepid backup database comprise SQL servers.

5. The method as recited in claim 1, further comprising replicating the primary database to the hot backup database to provide read access to data items within the hot backup database.

6. The method of claim 5, wherein the hot backup database comprises manual write failover in connection with the primary database.

7. The method of claim 1, further comprising asynchronously replicating snapshots of the primary database to the tepid backup database out-of-band.

8. The method of claim 7, wherein the tepid backup database further comprises at least one flag indicating a last known good snapshot of the primary database.

9. The method of claim 8, wherein initializing the tepid backup database comprises:
  determining a snapshot of the primary database indicated by the at least one flag; and
  restoring the snapshot of the primary database indicated by the at least one flag.

10. The method as recited in claim 1, wherein the telecommunication network comprises a fifth generation (5G) mobile communication network.

11. A system comprising:
  at least one processor:
  memory in electronic communication with the at least one processor; and
  instructions stored in memory, the instructions being executable by the at least one processor to:
    receive, from a requesting entity, a read request for a data item stored on a first layer of logically linked layers of physically separate databases within a core network of a telecommunication network;
    detect a cascading fault affecting a primary database within the core network associated with the data item and a hot backup database within the core network mirroring the primary database, wherein the primary database and the hot backup database are within the first logically linked layer of the physically separate databases;
    in response to detecting the cascading fault within the first logically linked layer, initialize a tepid backup database within a second logically linked layer of the physically separate databases within the core network, wherein the tepid backup database within the second logically linked layer is associated with the primary database and the hot backup database in the first logically linked layer and comprises asynchronously replicated snapshots of the primary database;
    access the data item within the tepid backup database initialized with the asynchronously replicated snapshot of the primary database taken before the cascading fault; and
    transmit the data item to the requesting entity.

12. The system as recited in claim 11, further storing instructions being executable by the at least one processor to asynchronously replicate snapshots of the primary database to a safe upgrade database within the second logically linked layer of the physically separate databases.

13. The system as recited in claim 12, further storing instructions being executable by the at least one processor to utilize the safe upgrade database by:
  deploying a cleanly installed first backup database to an upgrade site;
  restoring a replicated snapshot from the safe upgrade database to the first backup database;
  deploying a cleanly installed second database as a hot backup database to the first backup database;
  reassigning the first backup database as the primary database; and
  redirecting data item read requests from user equipments to the reassigned first backup database.

14. The system as recited in claim 11, wherein the primary database, the hot backup database, and the tepid backup database comprise SQL servers.

15. The system as recited in claim 11, further storing instructions being executable by the at least one processor to asynchronously replicate the primary database to the hot backup database to provide read access to data items within the hot backup database.

16. The system as recited in claim 15, wherein the hot backup database comprises manual write failover in connection with the primary database.

17. The system as recited in claim 11, further storing instructions being executable by the at least one processor to replicate snapshots of the primary database to the tepid backup database out-of-band.

18. The system as recited in claim 17, wherein the tepid backup database further comprises at least one flag indicating a last known good snapshot of the primary database.

19. The system as recited in claim 18, wherein initializing the tepid backup database comprises:
  determining a snapshot of the primary database indicated by the at least one flag; and
  restoring the snapshot of the primary database indicated by the at least one flag.

20. In a fifth generation (5G) mobile communication network including one or more subscriber data management functions and logically linked layers of physically separate databases, a method for providing extremely high read availability within the 5G mobile communication network comprising:
  receiving, within a core network of the 5G mobile communication network, a read request for a data item stored on a first layer of the logically linked layers of the physically separate databases from a requesting entity;
  detecting a cascading fault affecting a primary database within the core network associated with the data item and a hot backup database within the core network mirroring the primary database, wherein the primary database and the hot backup database are within the first logically linked layer of the physically separate databases;
  in response to detecting the cascading fault within the first logically linked layer, initializing a tepid backup database within a second logically linked layer of the physically separate databases within the core network, wherein the tepid backup database within the second logically linked layer is associated with the primary database and the hot backup database in the first logically linked layer and comprises asynchronously replicated snapshots of the primary database;
  accessing the data item within the tepid backup database initialized with the asynchronously replicated snapshot of the primary database taken before the cascading fault; and
  transmitting the data item to the requesting entity.

* * * * *